United States Patent [19]

Milhem et al.

[11] 4,327,538
[45] May 4, 1982

[54] HARVESTER

[75] Inventors: Robert Milhem, Calabasas; Steven K. Eisenberg, Simi; Mark W. Hancock, Los Angeles, all of Calif.

[73] Assignee: Whittaker Corporation, Los Angeles, Calif.

[21] Appl. No.: 248,085

[22] Filed: Mar. 27, 1981

[51] Int. Cl.³ .................... A01G 31/00; A01D 57/02; A01D 90/02
[52] U.S. Cl. .............................................. 56/1; 47/59
[58] Field of Search .......................... 47/9, 56, 59-65; 56/1; 171/31, 40

[56] References Cited

U.S. PATENT DOCUMENTS

| 2,810,988 | 10/1957 | Chin | 47/61 X |
| 3,163,234 | 12/1964 | Boyer | 171/31 X |
| 3,172,234 | 3/1965 | Eavis | 47/56 X |
| 3,227,222 | 1/1966 | Zimmerman | 171/31 X |
| 3,300,896 | 1/1967 | Lunstroth | 47/59 X |
| 3,362,106 | 1/1968 | Goldring | 47/56 |
| 3,541,979 | 11/1970 | Lorengen | 56/1 X |
| 3,664,061 | 5/1972 | Oepen | 47/59 |
| 4,159,597 | 7/1979 | Olsen | 47/58 |

FOREIGN PATENT DOCUMENTS

| 2037013 | 2/1972 | Fed. Rep. of Germany | 47/63 |
| 2340040 | 10/1977 | France | 47/65 |
| 1367452 | 9/1974 | United Kingdom | 47/56 |
| 1443326 | 7/1976 | United Kingdom | 47/62 |

OTHER PUBLICATIONS

Anon. "Danes Try Conveyor Belt Cropping", *The Grower*, Aug. 31, 1978, pp. 395 and 396.

*Primary Examiner*—James R. Feyrer
*Attorney, Agent, or Firm*—Donald E. Nist

[57] ABSTRACT

Am improved harvester is provided for hydroponically grown produce borne in spaced cups extending down through a flexible elongated strip along the length thereof. The harvester comprises a frame having at least one and preferably a number of guideways each having a pair of elongated spaced parallel rails secured in the frame and adapted to guide the flexible strip bearing the produce-containing cups. A strip guide roll and separation means are also secured to the frame for separating the produce-bearing portions of the growing cups from the flexible strip during its passage through the frame. A strip take-up reel and means for powering the same are in or adjacent to the frame. In one embodiment, the guide roll is adapted to fully eject the cups from the strip and slide means are provided for passage of said cups to a recovery area. In another embodiment, the guide roll raises the cups while the cups are still retained in the strip and blade means sever the raised portions of the cups. In a further embodiment a holder defining an elongated guideway for the strip is positioned in the frame upstream of the guide roll and includes blade means for severing that portion of each of the cups which depends below the strip. Such blade means may comprise a removable blade with its edge angled across the path of the strip and positioned below the strip. It effectively separates and recovers both the strip and the produce contained in the cups.

8 Claims, 6 Drawing Figures

HARVESTER

BACKGROUND OF THE INVENTION

1. Field of the Invention

The present invention generally relates to harvesting means and more particularly to an improved harvester for hydroponically grown produce transported in cups suspended in an elongated flexible strip.

2. Prior Art

Various types of equipment have been devised for hydroponically growing produce such as fruits and vegetables in controlled environments. One of the types of systems involves the use of fluid-bearing troughs covered with flexible plastic or the like in which are suspended growing plants. When it is time to harvest the plants, the covering for the trough must be removed and the plants hand picked and separated from the covering. Such a system requires a substantial amount of hand labor for the harvesting operation and is relatively slow and inefficient.

There is known an improved hydroponic growing system which employs an elongated trough containing a pair of tracks in which is disposed an elongated flexible strip. The strip has a plurality of vertical apertures extending therethrough and spaced along the length of the strip. Growing cups having upper outwardly extending flanges, bottoms which are permeable to plant roots and open tops are disposed vertically in the strips, the lower portions hanging down into the trough in contact with hydroponic growing fluid. The cups contain growing plants. Each trough may be supported in a frame or the like. When it is desired to harvest the plants the strip can be pulled to one end of the trough and the plants can be removed with or without the cups. The strip can then be cleaned and reused, and new cups containing fresh plants can be added thereto. While it is possible to harvest the plants from such a system by hand, it would be desirable to provide a mechanical harvester which would facilitate more rapid uniform harvesting of the plants.

SUMMARY OF THE INVENTION

The foregoing needs have been satisfied by the improved harvester of the present invention. The harvester is substantially as set forth in the Abstract above. Thus, it includes a frame to which are attached one or more guideways, each having a pair of spaced, elongated parallel rails to guide the strip through the frame, a strip guide roll, means for separating the produce-bearing growing cups from the strip and a take-up reel and means for powering the same. The separation means can include the guide roll to eject the cups from the strip or to raise them up for severing by a blade means. Alternatively, a holder having a pair of spaced rails and a blade fixed below the rails can be secured in the frame, preferably upstream of the guide roll, to sever the lower depending portions of the cups as they pass through the holder on the strip. Slide means or the like may also be provided for guiding the ejected cups or severed portions of the cups with the produce therein to a recovery area. With this system the flexible strip can be easily recovered from the take-up reel for reuse.

A motor may be utilized to impel the strip at a desired rate through the harvester and a plurality of strip-bearing troughs can be sequentially harvested by the harvester. More uniform harvesting with less damage to the produce is obtained more rapidly for improved efficiency of operation. Further advantages are set forth in the following detailed description and accompanying drawings.

DRAWINGS

DETAILED DESCRIPTION

FIG. 1

Figure 1:
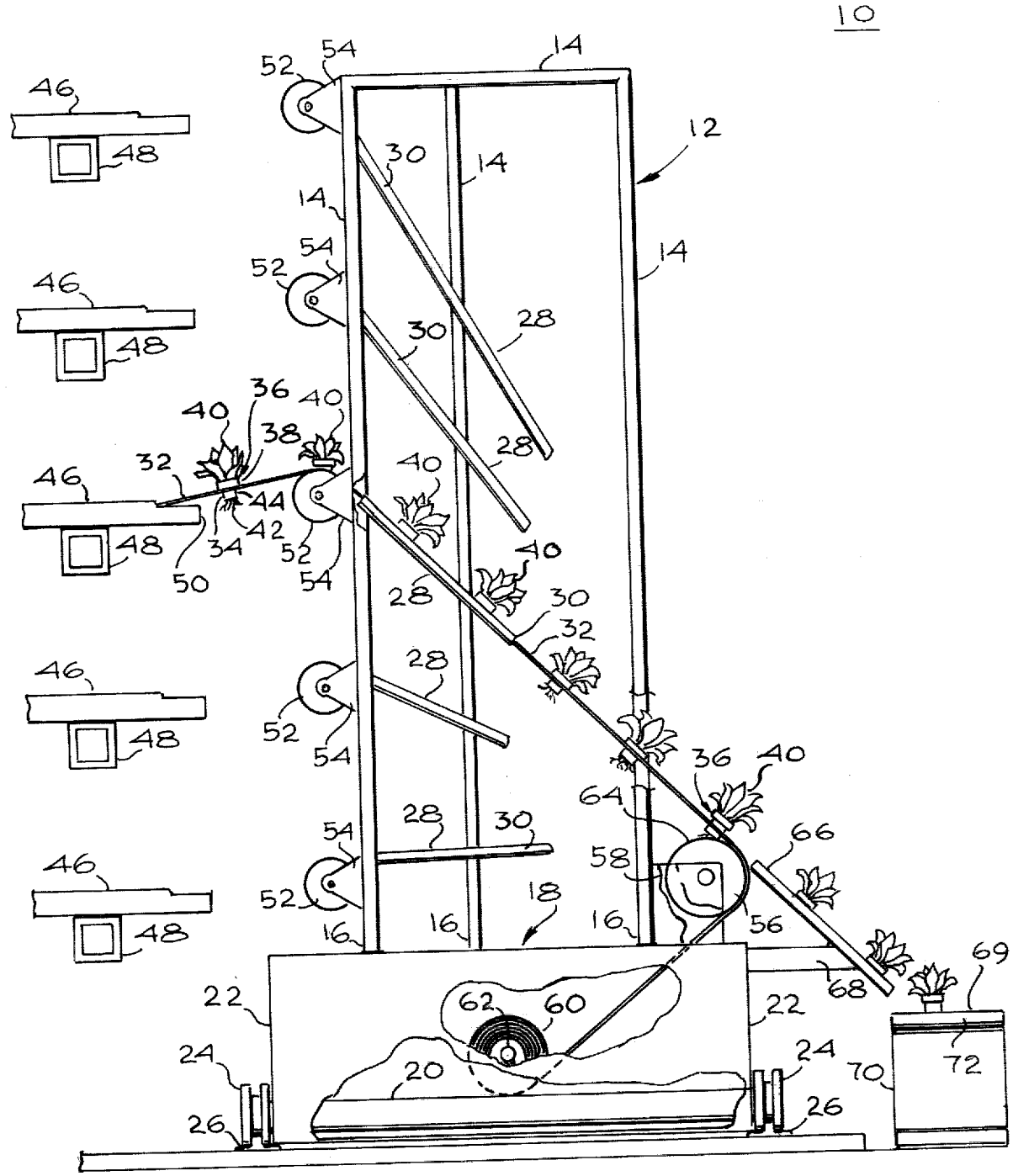
FIG. 1 is a schematic fragmentary side elevation, partly broken away of a preferred embodiment of the improved harvester of the present invention.

A preferred embodiment of the improved harvester of the present invention is schematically depicted in fragmentary side elevation, partly broken away, in FIG. 1 of the accompanying drawings. Thus, harvester 10 is shown which comprises an upstanding rectangular open frame 12 formed of a plurality of pipes 14 secured at the bottom ends 16 thereof to an enclosed rectangular base 18. Base 18 includes an elongated horizontal axle 20 which protrudes from opposite sides 22 of base 18 and is fitted to wheels 24 external of base 18. Wheels 24 ride on a pair of elongated spaced rails 26 so that frame 12 including base 18 can be moved along rails 26 to a desired harvesting position.

Harvester 10 also includes a plurality of vertically spaced guideways 28, each in the form of or including a pair of elongated parallel spaced rails 30 adapted to support and guide an elongated flexible stip 32 therethrough. Strip 32 bears spaced vertical apertures (not shown) down through which vertically depend the lower portions 34 of cups 36 having expanded upper rims 38. Cups 36 bear hydroponically grown produce 40, which produce extends above cups 36, the roots 42 thereof extending down through the porous bottom 44 of cups 36. Produce 40 is grown in cups 36 while supported by strip 32 in an elongated topped trough 46. A plurality of such troughs 46 are shown disposed in spaced vertical relationship on suitable supports 48. Troughs 46 contain hydroponic growing fluid (not shown).

When it is desired to harvest produce 40, strip 32 is pulled out of end 50 of a trough 46 and passed over a guide roller 52 secured by bracket 54 to a pipe 14 of frame 12 and then down through guideway 28 between rails 30 thereof. Each guideway 28 is held in a proper orientation, as by welding, bolting or otherwise securing the same to one or more pipes 14 of frame 12. Strip 32 bearing cups 36 and produce 40 passes from the downstream end of guideway 28 to and around a guide roll 56 secured to the downstream end of frame 12 by one or more brackets 58 and is directed by guide roll 56 downwardly toward take-up reel 60 disposed in base 18 and connected to motor means 62 for rotating reel 60 in order to wind up strip 32 thereon as shown in FIG. 1. As strip 32 passes around guide roll 56 each cup 36 passed into contact with surface 64 of guide roll 56 is forced up and out of the aperture in which it is disposed so that it is separated from strip 32 and passes into an inclined slide chute 66 secured by bracket 68 to one end of base 18. Each cup 36 thus freed of strip 32 slides through chute 66 to the upper surface 68 of a work table 70 which may include a moving belt 72 for transport of each cup 36 and produce 40 contained therein to a handling area (not shown).

It will be understood that with harvester 10 the strip 32 associated with each different one of troughs 46 can in turn be harvested to recover cups 36 and produce 40 therefrom as well as strip 32. Strip 32 thus recovered can be reused, as can cups 36 once they are separated from produce 40. Harvester 10 can also be moved down tracks 26 to various positions adjacent to other ones of troughs 46 (not shown), for harvesting in the manner described above.

In order to facilitate pulling of strip 32 from end 50 of trough 46, a blank portion of strip 32 can be temporarily connected thereto and fed over roller 52 and guide roll 56 and around reel 60. Motor 62 can then be operated to draw strip 32 at any desired rate from end 50 of trough 46 to accomplish the previously described harvesting operation. Once that operation is completed, strip 32 wound up on reel 60 can be freed therefrom, preferably then cleaned and returned to the opposite end of trough 46 for reuse with additional cups 36 placed therein, which cups contain fresh plants to be grown hydroponically in trough 46. Thus, harvester 10 is simple, inexpensive, durable and efficient, permitting easy, rapid harvesting of hydroponically grown produce.

FIG. 2

Figure 2:
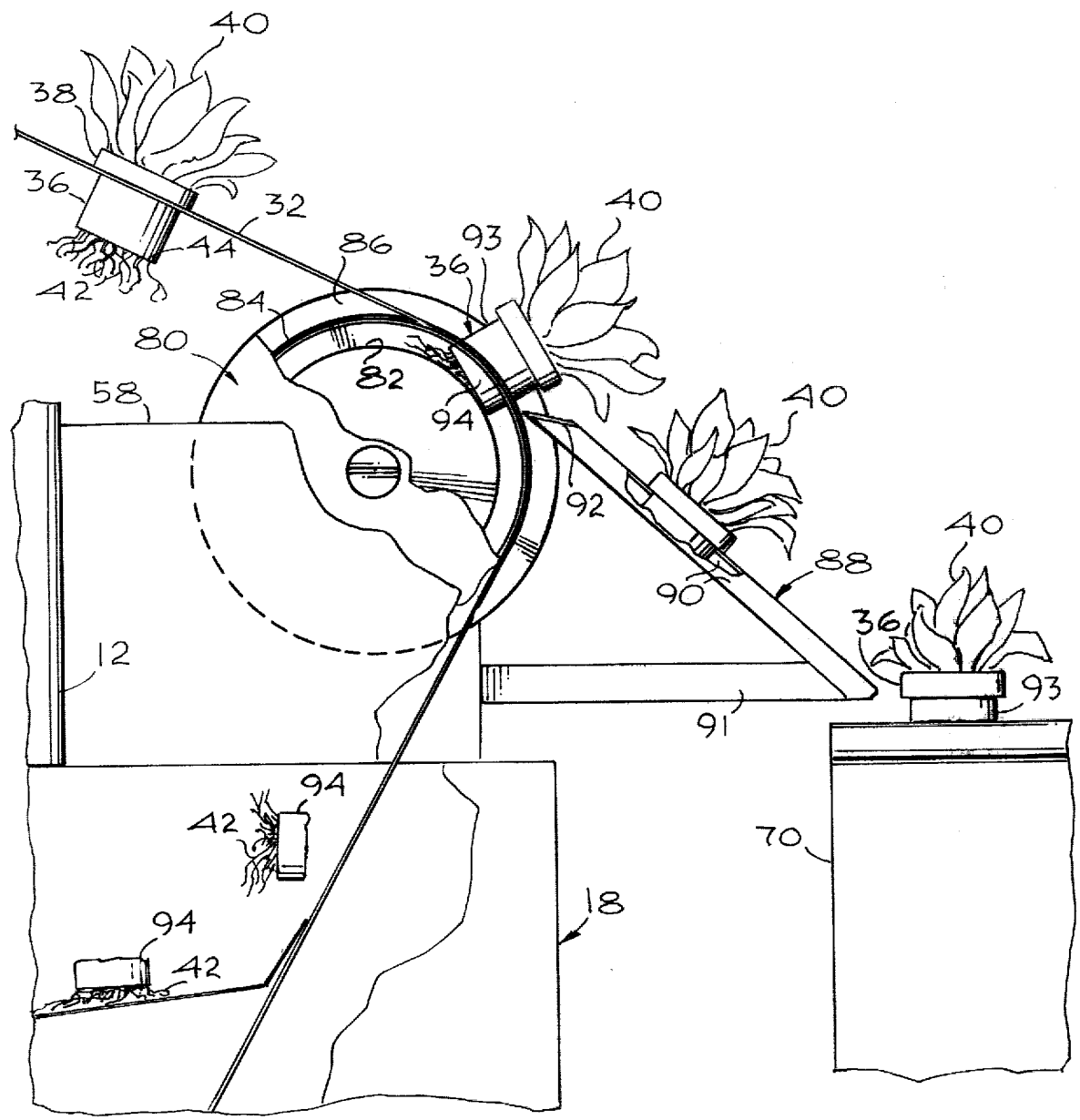
FIG. 2 is an enlarged schematic fragmentary side elevation of a modified version of the separation means of the improved harvester of the present invention, portions being broken away to illustrate certain internal features.

A modified version of the cup and produce separating means used in harvester 10 is illustrated schematically in FIG. 2. Thus, strip 32 is shown bearing cups 36 and produce 40 to a modified guide roll 80 connected by bracket 58 to frame 12. Roll 80 has a small diameter surface 82 and a larger diameter strip support 84 in the form of a pair of spaced rails 86. As strip 32 engages rails 86, surface 82 forces bottom 44 of cup 36 upwardly to partially eject it from strip 32, as shown in FIG. 2. An inclined slide guide 88 containing a pair of spaced parallel rails 90 is connected to arm 91 secured to bracket 58 and is positioned adjacent roll 80. Guide 88 has at its upstream end a knife blade 92 which acts to sever that portion 93 of cup 36 which is above strip 32 in roll 80 from the lower portion 94 of cup 36. Upper portion 93 of cup 36, together with produce 40, slides down guide 88 to recovery table 70 from which it is recoverable by workers or the like. The discarded severed lowered portions 94 of cups 36 drop down into a waste area for removal.

With this modification, produce 40 can be packaged directly with upper portion 93 of cups 36 or can more easily be removed therefrom, the roots 42 of produce 40 having been severed and discarded with portion 94.

FIGS. 3, 4, 5, and 6

Figure 3:
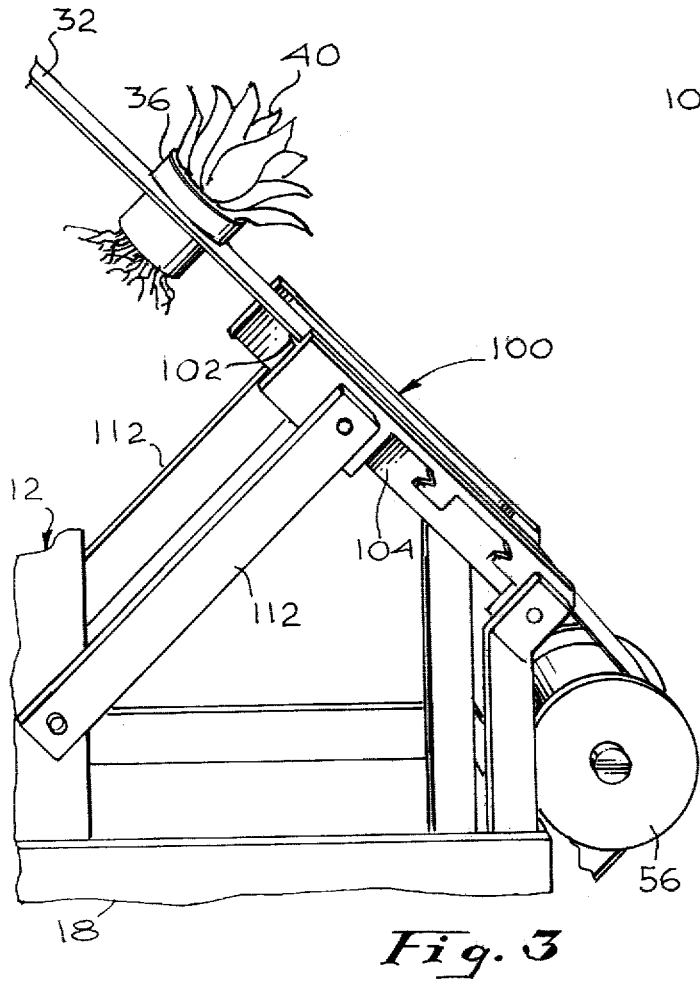
FIG. 3 is an enlarged fragmentary schematic perspective view of a further modification of the separation means in the improved harvester of the present invention.
Figure 4:
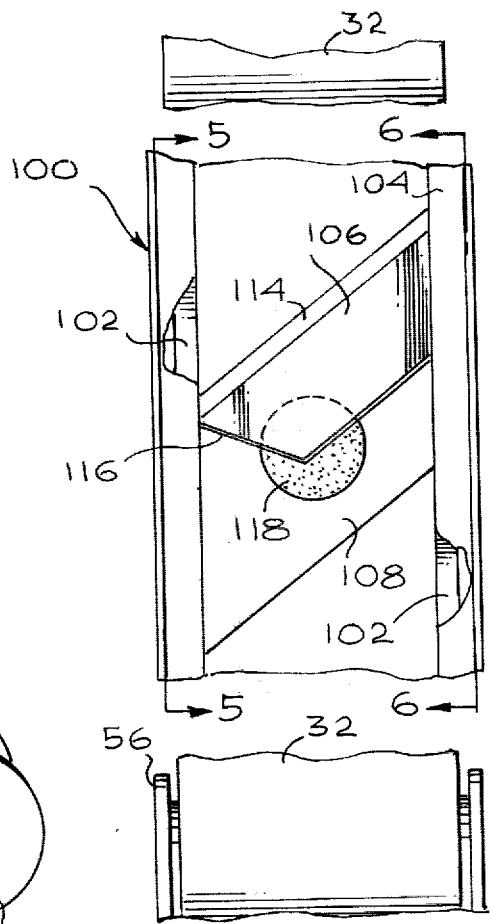
FIG. 4 is an enlarged fragmentary schematic top plan view of portions of the separation means shown in FIG. 3.
Figure 5:
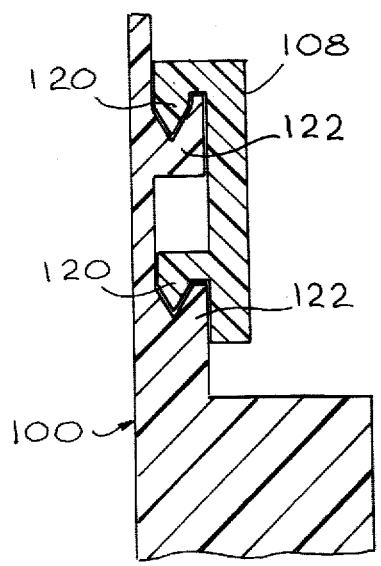
FIG. 5 is an enlarged fragmentary schematic cross-section taken along section line 5—5 of FIG. 4; and, FIG. 6 is an enlarged fragmentary schematic cross-section taken along the section line 6—6 of FIG. 4.
Figure 6:
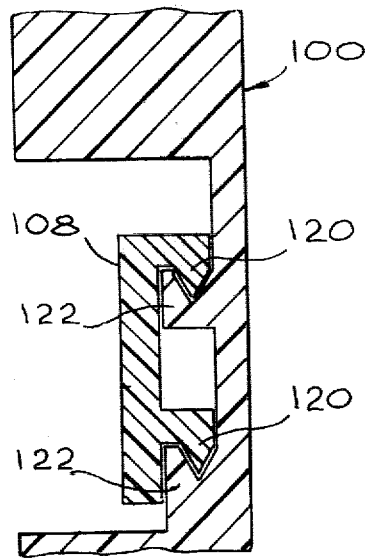

A further modification of the means for separating the produce 40 and cups 36 from strip 32 is shown schematically in FIGS. 3–6. Thus, strip 32 bearing cup 36 and produce 40 is shown being fed through an elongated holder 100 having a pair of spaced parallel longitudinal rails or tracks 102 therein over which strip 32 rides. The upstream end 104 of holder 100 is provided with a knife blade 105 (FIG. 4) disposed in a bracket 108. In FIG. 3, holder 100 is shown with blade 106 removed. Holder 100 is positioned upstream of guide roll 56 and is secured by brackets 112 to frame 12, as shown in FIG. 3.

Knife blade 106 has a cutting edge 114 disposed across holder 100 and sloping downstream at an angle of about 30°–45° from the transverse. Blade edge 114 is positioned immediately below strip 32 and between tracks 102 so that it will sever the lower portion of cup 36 below strip 32 from the remainder of cup 36. The upper severed portion can then pass by guide means or the like (not shown) to a recovery table (not shown) such as table 70 of FIGS. 1 and 2. The lower severed portion of cup 36 containing roots drops down to a waste area for removal. Blade edge 114 is angled to facilitate the severing.

Blade 114 is removable with bracket 108, is seated in a depressed area 116 thereof and is held tightly against bracket 108 by a magnet 118 disposed in area 116. Bracket 108 could be of any suitable configuration. For example, it may be angled across holder 100 and have configured edge portions 120 which are slideably received within mating portions 122 of holder 100, as particularly shown in FIGS. 5 and 6. It will be understood that bracket 108 could, if desired, extend perpendicular to the longitudinal axis of holder 100 instead of being angled therefrom and could have edges of any suitable configuration so as to be slideably received within holder 100. Blade 106 may be a single edge razor blade which can be readily replaced as it becomes worn.

This modified version of the separation means for harvester 10 is simple to manufacture, and is durable and efficient. The components of harvester 10 can be fabricated of any suitable material such as aluminum, steel or the like for frame 12, etc. Moreover, harvester 10 can be successfully used to harvest produce 40 from strip 32 and trough 46 even if produce 40 is disposed directly in openings in strip 32 without cups 36 being present at all.

Various modifications, changes, alterations and additions can be made in the improved harvester of the present invention, its components and their parameters. All such modifications, changes, alterations and additions as are within the scope of the appended claims form part of the present invention.

What is claimed i:

1. An improved harvester for harvesting hydroponically grown produce extending through openings in a flexible elongated strip along the length thereof, said harvester comprising, in combination:
   a. a frame;
   b. at least one elongated guideway comprising a pair of spaced parallel rails secured in said frame and adapted to guide a flexible strip having longitudinally spaced openings containing hydroponically grown produce extending down therethrough;
   c. a strip guide secured to said frame;
   d. means secured to said frame for separation of said produce from said flexible strip during passage of said strip through said frame; and,
   e. a strip take-up reel and means for powering said reel secured to said frame.

2. The improved hydroponic harvester of claim 1 wherein said strip guide is a roll adapted to eject growing cups containing said produce from said strip.

3. The improved hydroponic harvester of claim 2 wherein said harvester includes an inclined slide positioned to receive said growing cups ejected from said strip by said guide roll.

4. The hydroponic harvester of claim 1 wherein said strip guide is a roll adapted to raise growing cups containing said produce relative to said strip and wherein said separation means includes blade means positioned to sever the raised portion of said cups.

5. The hydroponic harvester of claim 4 wherein said separation means includes an inclined slide positioned to receive said raised severed portion of each of said cups.

6. The hydroponic harvester of claim 2 wherein said separation means includes a holder defining spaced elongated rails for said strip, said holder being secured to said frame upstream of said guide roll, and wherein said holder includes blade means positioned below or between said rails for severing that portion of each of said cups which extends below the strip.

7. The hydroponic harvester of claim 6 wherein said blade means is removable and is angled downstream in said holder.

8. The hydroponic harvester of claim 1 wherein a plurality of said guideways are secured in said frame in at least one of horizontal and vertical spaced relationship to each other, and wherein a plurality of said guide rolls are positioned in said frame to guide separate ones of said strips through said frame to said separation means and take-up reel.

* * * * *